Oct. 18, 1966     E. J. OTKEN     3,279,393
NOZZLE

Filed Jan. 10, 1964     3 Sheets-Sheet 1

INVENTOR
EDWIN J. OTKEN
BY
HIS ATTORNEYS

Oct. 18, 1966   E. J. OTKEN   3,279,393
NOZZLE
Filed Jan. 10, 1964   3 Sheets-Sheet 2

INVENTOR
EDWIN J. OTKEN
BY
HIS ATTORNEYS

Oct. 18, 1966  E. J. OTKEN  3,279,393
NOZZLE

Filed Jan. 10, 1964  3 Sheets-Sheet 3

INVENTOR
EDWIN J. OTKEN
BY

HIS ATTORNEYS

United States Patent Office 3,279,393
Patented Oct. 18, 1966

3,279,393
NOZZLE
Edwin J. Otken, North Brunswick, N.J., assignor to Good Humor Corporation, Brooklyn, N.Y., a corporation of Delaware
Filed Jan. 10, 1964, Ser. No. 336,912
10 Claims. (Cl. 107—1)

This invention relates to frozen confections in the form of twin bars and to multiple orifice nozzles utilized in the manufacture of such bars.

Twin bars are an effective medium for marketing sweet frozen foodstuffs, as, say, ices, ice creams and frozen fruit juices. Such a bar often is in the form of two parallel bar halves or columns joined together at a fusion zone, the bar having two parallel sticks or handles of which one is inserted in each column. It is common for each column of such a twin stick bar to be comprised of an inner core of frozen edible material and a layer around such core of a differing frozen edible material.

In those prior art twin stick bars, both inner cores of the bar have had the same composition, and the frozen material forming the outer covering of the bar has been of homogeneous composition. Therefore, such bars have been characterized by uniform outward appearance and by duplication in the two columns of the bar of the structural disposition of the frozen materials forming each column.

An object of this invention is to provide a twin bar frozen confection characterized by a variegated outer covering and by a variegated columnar structure.

Another object of this invention is to provide nozzle apparatus adapted to produce such a twin bar.

These and other objects are realized according to the invention by providing a multiple orifice nozzle adapted to extrude from one orifice an inner core of a first edible substance and an outer layer of a second edible substance, the nozzle being further adapted to extrude simultaneously from another orifice an inner core of the second substance and an outer layer of the first substance. By having the extrusion take place into a mold and by subsequently freezing the extruded material in the mold, a twin bar in accordance with the invention is produced.

For a more complete understanding of the present invention, reference may be had to the accompanying drawings in which.

Referring now to the figures, a nozzle 10 (FIGURES 1, 2 and 3) has for a top element a stainless steel spacer plate 11 perforated by a pair of bores or apertures 12 and 13. The spacer plate 11 has a smoothly ground lower surface 15.

Figure 5:
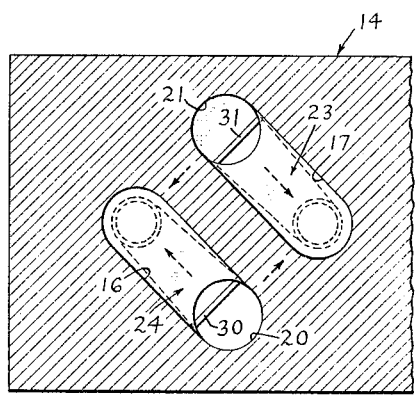
FIGURE 5 is a plan view taken along the line 5—5 of FIGURE 3.

A stainless steel rectangular distributing plate 14 (FIGURES 1 and 5) is disposed immediately below the lower surface 15 of the spacer plate 11 to form a liquid tight seal therewith. The distributing plate 14 is provided with a pair of milled slots 16 and 17 inclined at about 45° to the line of centers between bores 12 and 13. As shown, bore 12 opens downwardly into the left hand end of slot 16, and bore 13 opens downwardly into the right hand end of slot 17. The slots 16 and 17 have separate bottom closure walls 18 and 19 apertured by bores 20 and 21, respectively, at the ends of the slots opposite to those into which bores 12 and 13 open. The lower bores 20 and 21 having downward open ends at a smooth lower surface 22 for the distributing plate 14.

As is evident, the slots 16 and 17 are enclosed at top and bottom by plate 11 and by closure walls 18, 19 so as to form a pair of inlet spaces 23 and 24 having respective inlets 12, 13 and respective outlets 20, 21.

Figure 6:
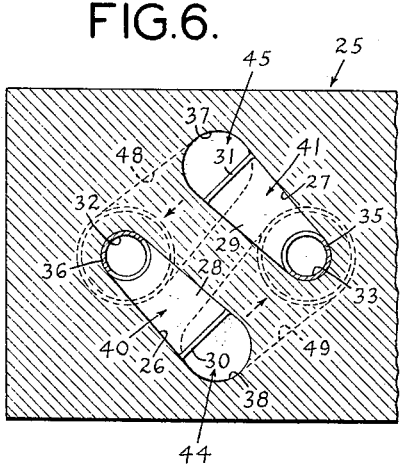
FIGURE 6 is a plan view taken along the line 6—6 of FIGURE 3.

A generally rectangular stainless steel inner nozzle plate 25 (FIGURES 1 and 6) is disposed below and in liquid tight contact with the lower surface 22 of the distributing plate 14. A pair of slots 26 and 27 are formed in inner nozzle plate 25 to be disposed directly below apertures 20 and 21, respectively, and to be parallel with, respectively, the inlet spaces 23 and 24. The bottoms of the slots 26 and 27 are provided by respective closure walls 28 and 29 apertured by respective apertures 32 and 33 having downward open ends at a smooth lower surface 34 for the inner nozzle plate 25. The apertures 32 and 33 are each disposed at the respective ends of the slots 26 and 27 opposite from the ends of the slots which are in communication with the inlet spaces 23 and 24 through, respectively, the apertures 20 and 21.

Figure 1:
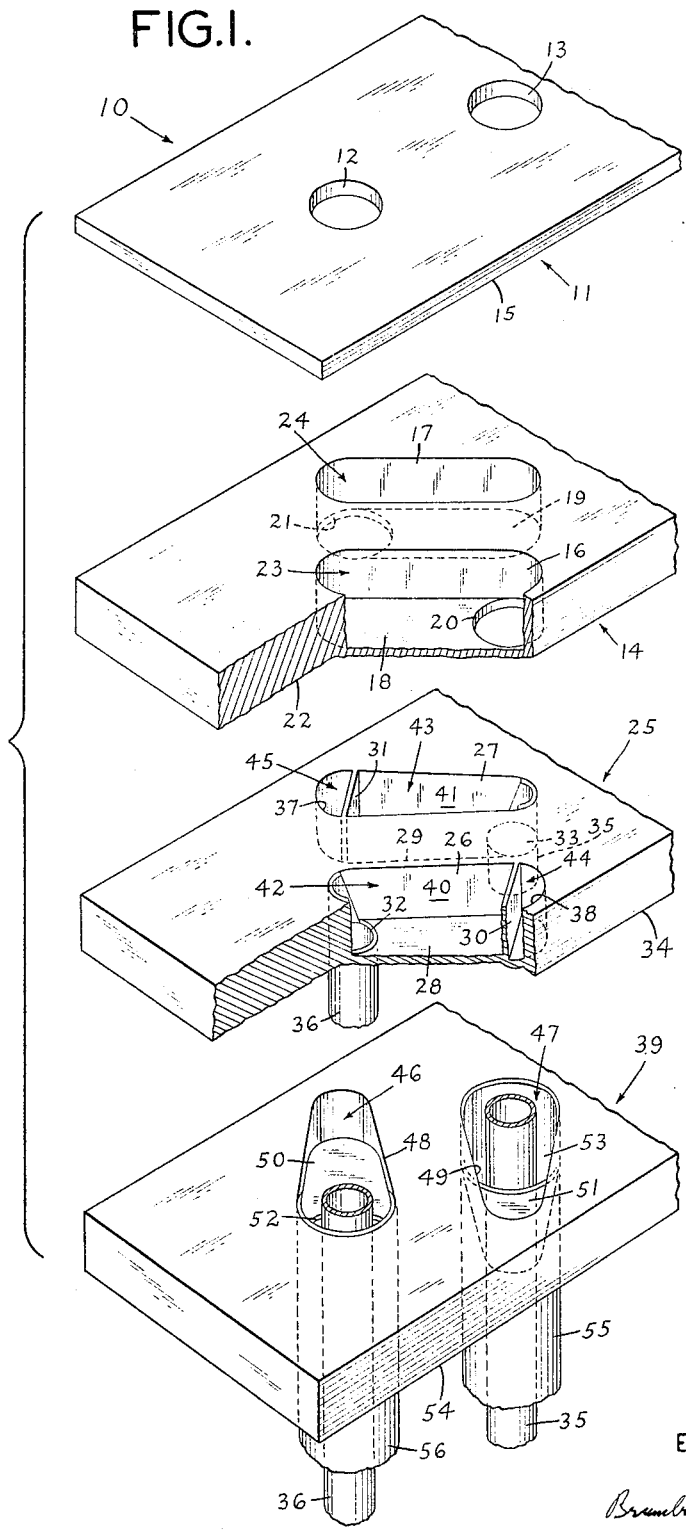
FIGURE 1 is an exploded view in perspective of one embodiment of the invention.
Figure 2:
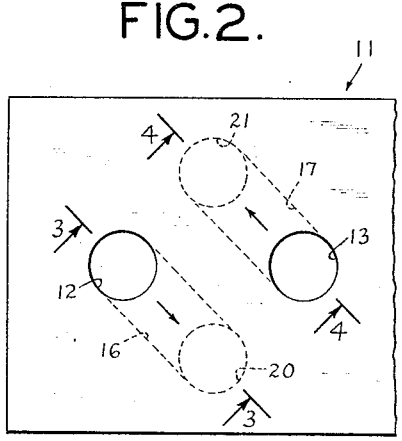
FIGURE 2 is a plan view of the embodiment of the invention shown in FIGURE 1.

The apertures 33 and 32 each accommodate the upper end of a respective one of a pair of hollow, inner flow tubes 35 and 36 (later described in more detail), which may have any suitable cross section such as the circular cross section shown in FIGURE 1. As illustrated, the two inner flow tubes extend downwardly beyond the lowest plate of the nozzle to project outwardly therefrom.

The slots 26 and 27 are also provided with respective vertical partitions 30 and 31 in transverse relationship with the lengthwise portions of the walls of the slots. Each of the partitions 30 and 31 is disposed directly beneath the corresponding one of the apertures 20 and 21 in distributing plate 14 to define a chord across the lower opening of that aperture and to divide such opening into major and minor circular segments.

A second pair of apertures 37 and 38 are formed in the inner nozzle plate 25 to be in alignment with and to match in transverse cross section the major circular segments of the apertures 20 and 21 defined by the partitions 30 and 31, respectively. The apertures 37 and 38 have downward openings at a lower surface 34 of the inner nozzle plate 25.

The slots 26 and 27 are enclosed at the top by plate 14 and at the bottom by closure walls 28 and 29 to form a pair of distribution conduits 40 and 41. The partitions 30 and 31 within those conduits divide them into major chambers 42 and 43 and into downwardly open minor chambers 44 and 45. As shown, inner flow tube 35 opens upwardly into major chamber 43 and inner flow tube 36 opens upwardly into major chamber 42.

Figure 7:
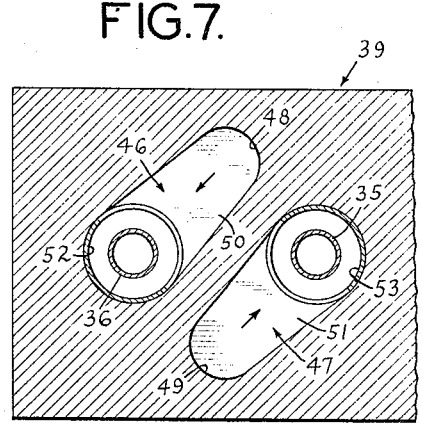
FIGURE 7 is a plan view taken along the line 7—7 of FIGURE 3.

A rectangular outer stainless steel nozzle plate 39 (FIGURES 1 and 7) is disposed immediately below and in intimate contact with the smooth lower surface 34 of the inner nozzle plate 25 to form a liquid tight union therewith. The outer nozzle plate 39 is provided with a pair of channels 46 and 47 perpendicular to the longitudinal axes of the distribution conduits 40 and 41 and formed by machining or otherwise suitably forming a pair of slots 48 and 49 in the last named plate. Those slots have respective bottom closure walls 50 and 51 which cooperate with the lower surface 34 of the inner nozzle plate 25 to enclose the channels.

The closure walls 50 and 51 of the channels 46 and 47 are apertured by respective bores 52 and 53 having downward open ends at a lower surface 54 of the outer nozzle plate 39. The bores 52 and 53 are respectively concentric with and of greater diameter than the inner flow tubes 35 and 36 which pass upwardly through those apertures and through the channels 46 and 47, to open into, respectively, the major chamber 42 of distribution conduit 40 and the major chamber 43 of distributing conduit 41.

Received within the respective bores 52 and 53 of the outer nozzle plate 39, (FIGURES 3, 4 and 7) by welding, sweating, or the like, are outer flow tubes 55 and 56 projecting downwardly beyond the lower surface 54 of the nozzle. Those outer flow tubes 55 and 56 open upwardly into channels 47 and 46, respectively, and are arranged concentric with and external to, respectively, inner flow tubes 35 and 36. Each of the outer flow tubes 55 and 56 is thus in the form of a concentric annulus around the outer surface of the corresponding inner flow tube. The tubes 35 and 55 form one discharge orifice for the described nozzle while the tubes 36 and 56 form another discharge orifice therefor.

The spacer plate 11, distributing plate 14, inner nozzle plate 25 and outer nozzle plate 39 are stacked together in liquid tight relationship by, say, dowels (not shwn) in a manner to permit ease in disassembly cleansing and reassembly.

Figure 3:
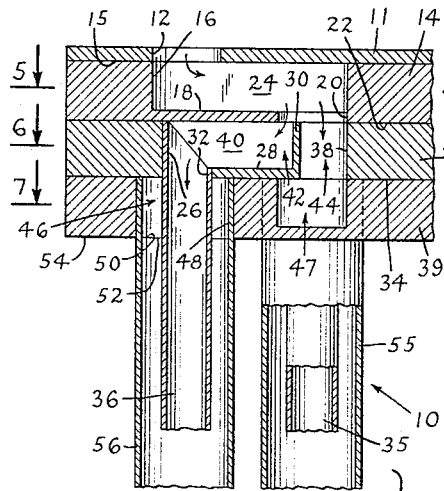
FIGURE 3 is a view in section taken along the line 3—3 of FIGURE 2.
Figure 4:
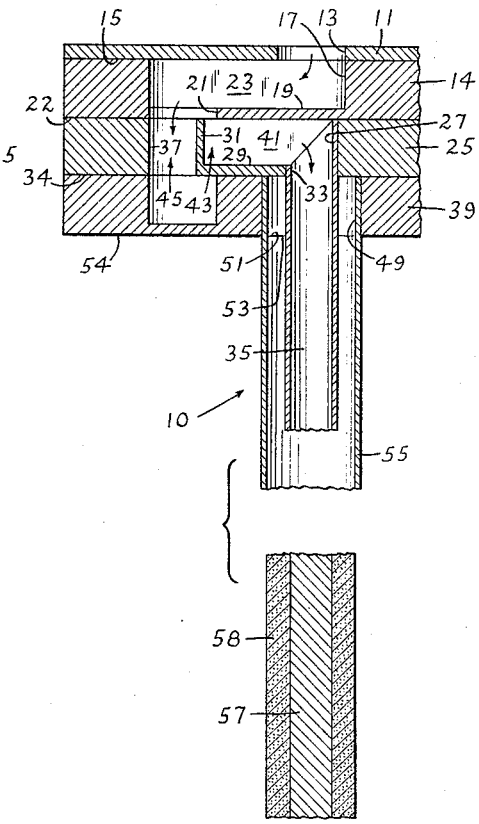
FIGURE 4 is a view in section taken along the line 4—4 of FIGURE 2.

In operation, chocolate ice cream, for example, is introduced into aperture 12 and strawberry ice cream, for example, is introduced into aperture 13 (FIGURE 3). The different masses of ice cream each fill a respective one of the inlet spaces 23 and 24 in the distributing plate 14. The two separate masses of ice cream then flow as ribbons through the apertures 20 and 21 and into the distribution conduits 40 and 41 where the partitions 30 and 31 each split the corresponding incoming ribbons into major and minor streams corresponding to the major and minor circular segments into which each of those last named apertures is divided by the partition associated therewith. The splitting action is such as to produce a fixed selected ratio or proportion between the larger mass flow rate of the major stream derived from each ribbon and the smaller mass flow rate of the minor stream derived from the same ribbon. As will now be described, the major and minor streams of each type of ice cream are discharged from, respectively, a nozzle inner tube and a nozzle outer tube belonging to opposite ones of the two orifices of the nozzle.

The chocolate ice cream is divided into two streams by partition 30 so as to fill the major chamber 42 and the minor chamber 44 in the distribution conduit 40. Similarly, the strawberry ice cream is divided into two streams by partition 31 so as to fill the major chamber 43 and the minor chamber 45 of distribution conduit 41.

The chocolate ice cream in major chamber 42 passes through the aperture 32 and into inner flow tube 36, while the strawberry ice cream in minor chamber 45 passes through aperture 37, channel 46, aperture 52, and into outer flow tube 56 around inner flow tube 36. Thus the nozzle 10 simultaneously extrudes a strawberry ice cream from the outer flow tube 56 and chocolate ice cream from the inner flow tube 36.

At the same time, the chocolate ice cream in minor chamber 44 passes through aperture 38, channel 47, and aperture 53 into outer flow tube 55 to form an annulus of chocolate ice cream around the inner flow tube 35. While this is going on, the strawberry ice cream in major chamber 43 passes through aperture 33 and into the inner flow tube 35. The two concentric tubes 35 and 55 hence extrude an inner core of strawberry ice cream and an outer layer of chocolate ice cream.

In its overall operation, therefore the nozzle 10 deposits two foodstuff columns 57 and 58 which have outer layers and inner cores of, say, different flavored ice creams reversed relative to each other, but which columns are otherwise symmetrical with each other. The mass flow rate of ice cream through each nozzle inner tube is greater than that through the corresponding concentric nozzle outer tube by an amount sufficient to render the inner core of each column of greater radius than the thickness of the outer layer surrounding that core.

Figure 8:
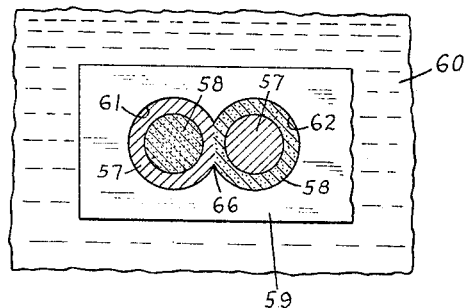
FIGURE 8 is a plan view of a mold for a frozen confection having a novel appearance.
Figure 9:
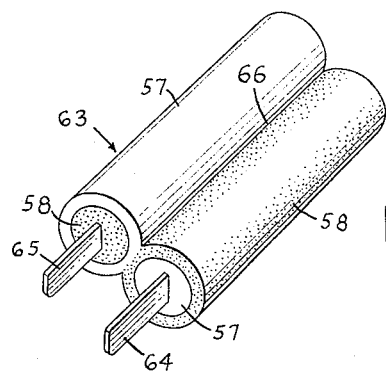
FIGURE 9 is a perspective view of one embodiment of a frozen confection according to the present invention.

As shown in FIGURE 8, the two foodstuff columns 57 and 58 are deposited from the nozzle 10 in a mold 59 in contact with a freezing brine solution 60. The mold 59 has two mold cavities 61 and 62 joined at a central fusion zone 66. The joined mold cavities 61 and 62 permit the two deposited columns of foodstuffs 57 and 58 to be frozen together at zone 66 to form a single frozen confection or twin bar 63 (FIGURE 9). Ordinarily, sticks 64 and 65 are respectively inserted into the right and left hand columns or halves of the twin bar 63 before or during the freezing process to render the twin bar a twin stick bar. After the material of the bar 63 has thoroughly solidified by freezing the mold 59 is removed from the freezing brine solution 60 and contacted with a bath of warm water to slightly melt the surface of the frozen material. The bar 63 may then be withdrawn from the mold for subsequent packaging, distribution and sale.

Thus there is provided a nozzle which simultaneously extrudes or deposits a novel product such as a frozen confection or the like, with adjacent inner cores and outer layers reversed relative to each other in a manner which offers distinct merchandising appeal and satisfies mass production requirements.

While a representative embodiment of a nozzle and of a food product in accordance with the invention have been shown and described for purposes of illustration, various changes and modifications may be made therein without departing from the principles of this invention. Therefore, all such changes and modifications are included within the intended scope of the invention as defined by the following claims.

I claim:
1. A multiple orifice nozzle for discharging into a mold two differing food materials adapted by being frozen in said mold to form a twin bar frozen confection, said nozzle comprising, a first inlet means for one of said materials and a second inlet means for the other of said materials, first and second discharge orifices each comprised of an inner tube and an outer tube around said inner tube, means connecting the inner and outer tubes of said first orifice to, respectively, said first and second inlet means, and means connecting the inner and outer tubes of said second orifice, to, respectively, said second and said first inlet means.

2. A nozzle as in claim 1 in which said two inlet means, said two orifices, and said means interconnecting said orifices with said two inlet means are symmetrical to produce equal rates of flow of material from said two orifices.

3. A multiple orifice nozzle for discharging into a mold two differing food materials adapted by being frozen in said mold to form a twin bar frozen confection, said nozzle comprising, a first inlet means for one of said materials and a second inlet means for the other of said materials, first and second discharge orifices each comprised of an inner tube and an outer tube around said inner tube, means connecting the inner and outer tubes of said first orifice to, respectively, said first and second inlet means, means connecting the inner and outer tubes of said second orifice to, respectively, said second and said first inlet means and means to divide in fixed proportion between the two tubes connected to each inlet means the food material entering such inlet means and flowing through such tubes.

4. A nozzle as in claim 3 in which said dividing means is effective to produce a flow of relatively different amounts of material through respectively, the inner tube and the outer tube of each orifice.

5. A multiple orifice nozzle for discharging into a mold two differing food materials adapted by being frozen in said mold to form a twin bar frozen confection, said nozzle comprising, a first inlet means for one of said materials and a second inlet means for the other of said materials, a pair of partitions of which each divides a respective one of said inlet means into first and second openings, first and second discharge orifices each comprised of an inner tube and an outer tube around said inner tube, means connecting the inner and outer tubes of said first orifice to, respectively, the first opening of said first inlet means and the second opening of said second inlet means, and means connecting the inner and outer tubes of said second orifice to, respectively, the first opening of said second inlet means and the second opening of said first inlet means.

6. A nozzle as in claim 5 in which said two inlet means are unequally divided by their respectively associated partitions to render said first openings of greater size than said second openings.

7. A nozzle as in claim 5 in which each inlet means comprises an enclosed inlet space having an inlet aperture and an outlet aperture of which the latter is divided into said first and second openings by the partition associated with such inlet means.

8. A multiple orifice nozzle for discharging into a mold two differing food materials adapted by being frozen in said mold to form a twin bar frozen confection, said nozzle comprising, means forming a first distribution conduit for one of said materials and a second distribution conduit for the other of said materials, means forming first and second apertures to supply said one and said other material to, respectively, said first and second conduits, a partition disposed in each conduit across said conduit and across the supply aperture therefor to divide such conduit into first and second chambers which are each open to such aperture, first and second discharge orifices each comprised of an inner tube and an outer tube around said inner tube, the inner tubes of said first and second orifices being connected directly to, respectively, the first chamber of said first conduit and the first chamber of said second conduit, conduit means connecting the outer tube of said first orifice to the second chamber of said second conduit, and conduit means connecting the outer tube of said second orifice to the second chamber of said first conduit.

9. A nozzle as in claim 8 in which said two conduit means each comprises a channel having opposite ends connected to, respectively, the second chamber of the corresponding one of said distribution conduits and the outer tube of the corresponding one of said orifices.

10. A multiple orifice nozzle for discharging into a mold two differing food materials adapted by being frozen in said mold to form a twin bar frozen confection, said nozzle comprising, an inner plate having formed therein first and second spaced conduits which are open downwardly both through first and second respective bores formed in said plate at two diagonally opposite ends of said conduits and through first and second respective apertures formed in said plate at the other ends of said conduits, first and second inlet means for, respectively, said first and second conduits, an outer plate disposed below and against said inner plate and having formed therein a first channel bridging said conduits to be upwardly open to said second aperture and to be downwardly open through a first hole in said outer plate coaxial with and diametrally larger than said first bore, said outer plate also having formed therein a second channel bridging said conduits to be upwardly open to said first aperture and to be downwardly open through a second hole in said outer plate coaxial with and diametrally larger than said second bore, first and second inner tubes passing from below said outer plate through, respectively, said first and second holes to be connected to, respectively, said first and second conduits by being received in, respectively, said first and second bores, and first and second outer tubes extending from below said outer plate around, respectively, said first and second inner tubes to be respectively connected to said first and second channels by being received in, respectively, said first and second holes, said first tubes and said second tubes forming, respectively, a first discharge orifice and a second discharge orifice for said nozzle.

References Cited by the Examiner

UNITED STATES PATENTS

| | | | |
|---|---|---|---|
| 2,067,750 | 12/1937 | Bagby | 141—100 X |
| 2,500,006 | 3/1950 | Overland | 249—52 |
| 2,673,675 | 3/1953 | Anderson | 107—1 |

IRVING BUNEVICH, *Primary Examiner.*